May 22, 1951          L. O. KRAUSE          2,554,196

POWER FACTOR INDICATOR FOR ANTENNAS

Filed June 29, 1949          2 Sheets-Sheet 1

Inventor:
Lloyd O. Krause,
by Merton D. Morse
His Attorney.

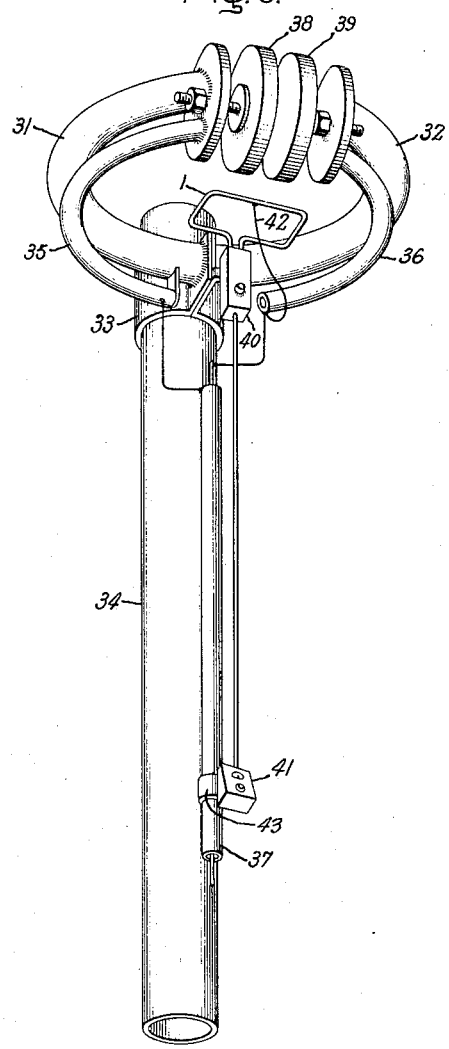

Patented May 22, 1951

2,554,196

UNITED STATES PATENT OFFICE 2,554,196

POWER FACTOR INDICATOR FOR ANTENNAS

Lloyd O. Krause, North Syracuse, N. Y., assignor to General Electric Company, a corporation of New York Application June 29, 1949, Serial No. 101,993

4 Claims. (Cl. 172—245)

This invention relates generally to phase measuring meters and more particularly to a device of this type adapted to indicate the tuning of radio antennas.

Radio antennas used at high frequencies quite often comprise multiple radiators which must be adjusted in definite phase relation so as to obtain a particular radiation pattern. In general, the tuning requirements are fulfilled when each radiator or bay of an antenna system is adjusted so that the current at its input terminals is in phase with the voltage applied thereto, a condition which provides a minimum standing wave ratio in the radiator feed line. However, the actual current in the radiator may not be in phase with the applied voltage because of feed and terminal effects. Furthermore, the phase of the radiation current, compared to the applied voltage, may vary with frequency for any particular radiator.

It is well known that the phase relations between current and voltage at the input terminals of a network may be compared by deriving voltage components proportional to them, and measuring the phase relation between the derived components. Such, for instance, is the principle on which the phase meters employed at the lower frequencies operate. However, it is generally impossible to apply directly, at the higher frequencies, the techniques utilized in low frequency phase meters.

Accordingly, it is an object of this invention to provide a new and improved phase indicating meter adapted for use at high frequencies.

Another object of this invention is to provide a phase measuring device suitable for use as a tuning indicator for high frequency antennas.

A further object of this invention is to provide an antenna tuning indicator, operating on the principle of measuring the phase angle between the radiation current and the voltage at the input terminals of a radiator, and which may be conveniently put into operation without opening or altering existing antenna circuit connections.

For further objects and advantages and for a better understanding of the invention, attention is now directed to the following description and accompanying drawings. The features of the invention believed to be novel are more particularly pointed out in the appended claims.

In the drawing—

Fig. 3 is a pictorial representation of an antenna tuning indicator embodying my invention, which has been located in operating position with respect to a high frequency antenna of the folded circular dipole type.

My antenna tuning indicator operates on the principle of combining a voltage having a certain required phase angle with respect to the voltage applied at the input terminals of an antenna, with a pair of voltages proportional to and in quadrature with the antenna radiation current. The combination of these voltages produces a pair of resultant voltages which are equal in magnitude when the terminal current is in phase with the applied voltage, but which are unequal under any other conditions. These two resultant voltages are detected or rectified to produce a pair of unidirectional voltages retaining only the amplitude characteristics of said resultant voltages. These unidirectional voltages are supplied to the end point of a bridge circuit incorporating a meter, and the meter deflection provides a measure of the phase angle.

Figure 1:
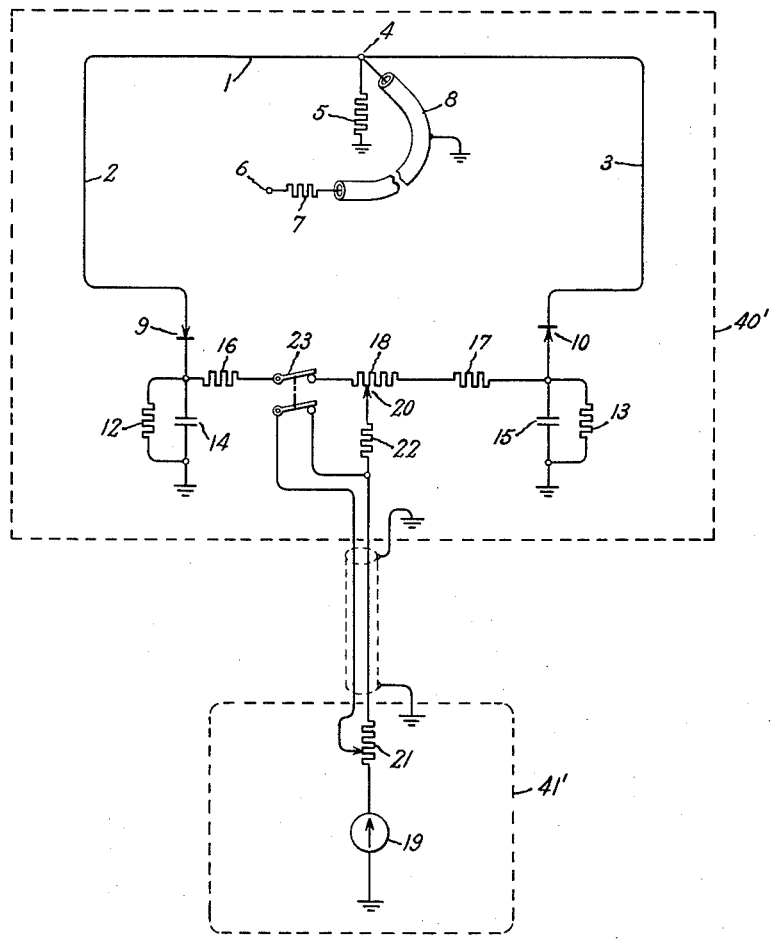
Fig. 1 is a schematic diagram of a phase measuring device embodying my invention.

Referring to Fig. 1, a loop 1 having a pair of symmetrical branches 2 and 3 constitutes an inductor for producing a voltage proportional to the alternating magnetic field passing therethrough, and in quadrature with the current producing this field. As will appear presently, this loop is positioned close to the midpoint of a dipole radiator in a manner to intercept the magnetic field created by the radiation current circulating therein.

The midpoint 4 of loop 1 is connected to ground through a resistor 5. This midpoint serves as a terminal to which, in an ideal case, the input voltage to the antenna terminals may be applied directly. In a modification of my antenna tuning indicator, the antenna input voltage, instead of being applied directly to the midpoint 4, is applied to a terminal 6 which is connected to midpoint 4 through a series resistor 7 and a phase delay line 8, whose purpose will be explained subsequently.

The free terminals of branches 2 and 3 of loop 1 are connected respectively to rectifiers 9 and 10 which are arranged to conduct in opposite directions. These rectifiers may be of the well known crystal type which has the advantage of very small physical size. Rectifier 9 is connected to conduct on the positive half-cycles of the voltage applied to it from branch 2, while rectifier 10 is connected to conduct on the negative half-cycles of the voltage applied to it from branch 3. The opposite terminals of rectifiers 9 and 10 are connected respectively to a pair of resistance-capacitance combinations comprising resistors 12 and 13 and capacitors 14 and 15.

In operation, capacitor 14 charges in a positive direction to a value close to the peak of the voltage applied to rectifier 9, whereas capacitor 15 charges in a negative direction to a value close to the peak of the voltage applied to rectifier 10.

Figure 2:
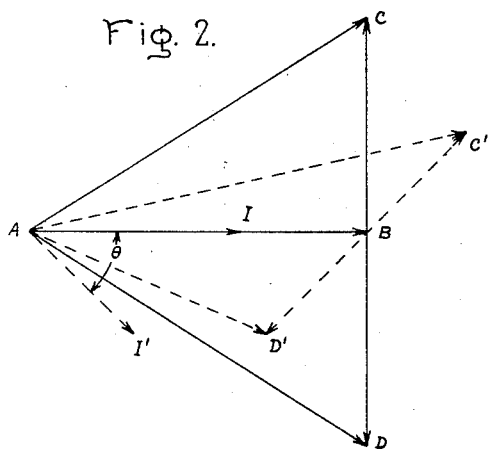
Fig. 2 is a vector diagram illustrating voltage relations in the circuit of Fig. 1.

Referring to Fig. 2, the phase relations between the voltage and current in the antenna and the voltages applied to rectifiers 9 and 10 may be described in terms of the vectors shown. Assuming that the antenna radiation current is in phase with the voltage applied to point 4 of loop 1, the vector AB represents this applied voltage, and the vector AI represents the antenna radiation current. The voltage induced in branch 2 of loop 1 is then represented by vector BC and that induced in branch 3 by vector BD. These voltages may be combined vectorially and the resultant voltages represented by vectors AC and AD. Vector AC is then the voltage existing between the loop side of rectifier 9 and ground, whereas voltage AD is that existing between the loop side of rectifier 10 and ground. Since phase relations are lost in the rectification process, the positive unidirectional voltage produced across capacitor 14 is then proportional to the amplitude of vector AC, whereas the negative voltage produced across capacitor 15 is proportional to the magnitude of vector AD.

Assuming now that the antenna radiation current is lagging the voltage applied at point 4 of loop 1, the voltage may still be represented by vector AB, and the current may be represented by a vector AI' lagging behind vector AB by a phase angle $\theta$. Vector AI' induces a pair of voltages BC' and BD' in branches 2 and 3 respectively of loop 1. These voltages are still equal in magnitude and are in quadrature with the antenna radiation current, but their vectorial addition to the input voltage AB now produces resultants AC' and AD' which are unequal in magnitude. The rectified voltages across capacitors 14 and 15 then change in magnitude proportionally, so that the positive voltage across capacitor 14 becomes greater in magnitude than the negative voltage across capacitor 15. For a leading antenna radiation current, voltage AD' exceeds AC' and capacitor 15 becomes charged more negatively than 14 does positively.

The remainder of the circuit of Fig. 1 constitutes a bridge for providing a meter indication proportional to the difference in the magnitudes of the potentials across capacitors 14 and 15. Capacitors 14 and 15 are connected, through resistors 16 and 17 respectively, to the opposite terminals of a potentiometer 18. A meter 19 is connected, between ground and a tap 20 on potentiometer 18, by a potentiometer 21 and a fixed resistor 22. Resistors 16 and 17 are selected to be equal in value, and tap 20 is normally adjusted to the midpoint of potentiometer 18. The voltage at tap 20 is then the mean value of the rectified voltages across capacitors 14 and 15. Accordingly, when the rectified voltages are equal in magnitude, because of the fact that they are of opposite polarities, the mean value is zero. If the rectified voltage across capacitor 14 is larger than that across capacitor 15, a positive voltage results at tap 20, whereas a negative voltage results when conditions are reversed.

In practice meter 19 is of the center indicating type and deflects in one direction or the other, depending on the relative magnitudes of the rectified voltages. Since these magnitudes vary as the phase angle between the voltage applied at point 4 of loop 1 and the resulting antenna radiation current, meter 19 may be calibrated to read directly the antenna current phase angle. The purpose of adjustable resistor 21 is to provide a sensitivity control for meter 19, while that of fixed resistor 22 is to provide a sensitivity limiting device for protecting the meter.

A switch 23, which has been shown in its closed position, has two circuits, one of which is connected between resistor 16 and potentiometer 18, and the other between the junction of resistor 22 and potentiometer 21, and the adjustable tap on potentiometer 21. When switch 23 is opened, the voltage developed across capacitor 15 alone is effective at meter 19 which operates at minimum sensitivity. The device then becomes simply a level indicator, which provides an indication of the magnitude of the voltage supplied to the antenna. This feature may be utilized in the process of tuning an antenna for obtaining a proper operating level for the tuning indicator. Furthermore, this feature may be utilized to indicate the voltage levels in the different radiators of a multibay array after these have been tuned.

Resistors 12 and 13 provide independent loading circuits for crystal rectifiers 9 and 10. If these resistors were not provided, the effective loading for one crystal would be a function of the rectified potential produced by the other crystal. Since these rectified potentials vary with the tuning adjustment and with crystal rectification efficiency, these resistors are useful in improving the stability of operation. Adjustable potentiometer 18 is provided so that the device may be calibrated to read zero on meter 19 before each period of service. This calibration is necessitated by the fact that resistors 16 and 17 may not be exactly equal, and also the rectification efficiency of the crystals may vary.

In practice, the full value of the input voltage to the antenna terminals cannot be applied to midpoint 4 of loop 1. In the first place, for sensitive phase discriminating action, a very large coupling loop would be required to obtain a satisfactory ratio of induced voltage, as represented by vectors BC and BD, to the directly coupled voltage represented by vector AB. In the second place, the power supplied to the antenna would have to be reduced to such a low value as to make it difficult to control when using standard transmitters to provide the signal. Consequently, the antenna input voltage must be attenuated before being supplied to midpoint 4. Furthermore, as it has been stated earlier, the optimum tuning of an antenna may occur when the radiation current is otherwise than in phase with the applied voltage. In practice, one type of antenna structure may be designed to operate anywhere within the range of frequencies, and accordingly, for optimum tuning, the relation of zero phase angle between radiation current and terminal voltage may hold true at one frequency only in this range, or may not occur at all. Proper operation of the tuning indicator requires that the voltage applied to point 4 of loop 1 be in phase or 180° out of phase with the antenna radiation current. Generally, then, the terminal voltage will require a phase shift before being applied to point 4 of loop 1.

If the required phase shift is constant throughout the operating frequency range of the antenna, a resistance-capacitance type of phase-shifter may be employed. Generally, however, the phase shift required varies with frequency. In such case, a network having the proper time delay corresponding to the change of phase with respect to frequency in the antenna may be used to provide the required phase shift. Of course, this network must also provide the required initial phase shift, independently of any change occurring with frequency variation.

Referring to Fig. 1, such a time-delay network has been provided by the section of transmission line 8 and the series resistor 7 connected between midpoint 4 and terminal 6. Resistor 7, with the input impedance of line 8, serves as a voltage divider to reduce the applied terminal voltage. With this time-delay network, the tuning indicator may be utilized at any particular frequency within the range for which the antenna is designed, and a zero indication on meter 19 then indicates proper tuning.

Referring to Fig. 3, there is shown a practical construction of an antenna tuning indicator embodying my invention. The indicator is mounted in operating position with respect to a high frequency radiator of the circular folded dipole type. The radiator comprises a pair of arms 31 and 32 which are affixed through a suitable bracket 33 to a mast 34. Arms 31 and 32 are formed to a ring shape and folded back upon themselves into a pair of smaller arms 35 and 36 respectively. Arm 35 is grounded at a bracket 33, whereas arm 36 is free to receive high frequency potentials from the inner conductor of a concentric transmission line 37. The antenna is tuned by adjusting the spacing of a pair of circular capacitor plates 38 and 39.

In this embodiment of my invention, the circuit components shown within the dotted rectangle 40' in Fig. 1 are contained, with the exception of loop 1, within a small box 40. Box 40 is affixed by suitable means to bracket 33 of the circular radiator, in such a way that the plane of the loop projecting from the top side of the box is parallel with the plane of the circular radiator. The circuit components shown within the dotted rectangle 41' of Fig. 1, are mounted within a box 41 and this box is located below the circular radiator and held in position by a suitable clamp 43. The connection from the midpoint of loop 1 to the free end of the radiator arm 36 is made through a connecting wire 42. The phase delay line 8 and resistor 7 of Fig. 1 have not been shown. However, in an actual embodiment the line 8 may be enclosed within the box 40 and a series connection through resistor 7 made thereto from the free end of arm 36 to the midpoint of loop 1.

While I have shown the coupling loop maintained in place entirely through its own rigidity, it will, of course, be evident that suitable dielectric supports may be provided for it. My invention thus provides an antenna tuning meter which is compact and easily mounted in operating position with respect to the antenna and which does not require that any of the connections already existing be disturbed. The tuning indicator, being mounted along the center line of the radiators, has very little de-tuning effect upon the antenna. Moreover, since box 41 containing indicating meter 19 may be mounted remote from the antenna, the operator does not detune the antenna through his body capacity, since he need not be in proximity to the radiators when taking a reading.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A device for indicating the difference in phase between current and voltage at the input terminals of a radiator, comprising a coupling loop adapted to be located in the magnetic field of the radiator, a connection between the center point of said loop and one of said input terminals, a pair of reversely connected rectifying circuits between the free ends of said loop and said other input terminal, and a bridge network comprising an indicating meter connected between said circuits and said other input terminal for indicating the difference in potential produced across said circuits.

2. A device for indicating the difference in phase between high frequency current and voltage at the input terminals of a radiator, comprising a coupling loop adapted to be located in the magnetic field of the radiator, a connection between the center point of said loop and one of said input terminals, a pair of rectifiers reversely connected to the free ends of said loop for conducting in opposite directions, a pair of impedances comprising a resistance and a capacitance in parallel connected between said rectifiers and said other input terminal, one of said impedances charging positively and the other negatively as a result of currents supplied thereto through said rectifiers, and a bridge network comprising an indicating meter connected between said impedances and said other input terminal for indicating the difference in the potentials produced across said impedances as a result of phase changes between said high frequency current and voltage.

3. A device for indicating the difference in phase between high frequency current and voltage at the input terminals of a radiator, comprising a coupling loop adapted to be located in the magnetic field of said radiator, a connection between the center point of said loop and one of said input terminals, a pair of rectifiers reversely connected to the free ends of said loop for conducting in opposite directions, a pair of impedances each comprising a resistance and a capacitance in parallel connected between said rectifiers and said other input terminal, one of said capacitances charging positively and the other negatively as a result of currents supplied thereto through said rectifiers, a resistance connected between said capacitors, and a meter connected between the center point of said last named resistance and said other input terminal for indicating the difference in the potentials produced across said impedances as a result of phase changes between said high frequency current and voltage.

4. An antenna tuning indicator for indicating the difference in phase between high frequency current and voltage at the input terminals of a radiator, comprising a coupling loop adapted to be located in the magnetic field of the radiator for obtaining a voltage component proportional to and in quadrature with said current, a connection between the midpoint of said loop and one of said input terminals, said connection comprising a length of line for providing a phase delay between the voltage applied to said midpoint and the voltage at said input terminals, a pair of rectifiers reversely connected to the free ends of said loop for conducting in opposite directions, a pair of impedances, each containing a resistance in parallel with a capacitance connected between said rectifiers and said other input terminal, one of said capacitances charging positively and the other negatively as a result of currents supplied thereto through said rectifiers, a resistance connected between said capacitors, and a meter connected between the center point of said last named resistance and said other input terminal for indicating the difference in the potentials produced across said impedances as a result of phase changes between said high frequency current and voltage.

LLOYD O. KRAUSE.

REFERENCES CITED

The following references are of record in the file of this patent:

UNITED STATES PATENTS

| Number | Name | Date |
| --- | --- | --- |
| 2,283,676 | Kandoian | May 19, 1942 |
| 2,297,255 | Schulze-Herringen et al., | Sept. 29, 1942 |
| 2,424,131 | Warnick | July 15, 1947 |